US005684990A

United States Patent [19]
Boothby

[11] Patent Number: 5,684,990
[45] Date of Patent: Nov. 4, 1997

[54] SYNCHRONIZATION OF DISPARATE DATABASES

[75] Inventor: David J. Boothby, Nashua, N.H.

[73] Assignee: Puma Technology, Inc., San Jose, Calif.

[21] Appl. No.: 371,194

[22] Filed: Jan. 11, 1995

[51] Int. Cl.$^6$ .................................................. G06F 17/30
[52] U.S. Cl. .................................................. 395/619
[58] Field of Search ................................. 395/600, 610, 395/619, 620

[56] References Cited

U.S. PATENT DOCUMENTS

| | | | |
|---|---|---|---|
| 4,432,057 | 2/1984 | Daniell et al. | 364/300 |
| 4,807,182 | 2/1989 | Queen | 364/900 |
| 4,866,611 | 9/1989 | Cree et al. | 364/705.08 |
| 4,875,159 | 10/1989 | Cary | 364/200 |
| 4,956,809 | 9/1990 | George et al. | 364/900 |
| 5,065,360 | 11/1991 | Kelly | 395/800 |
| 5,142,619 | 8/1992 | Webster | 395/157 |
| 5,187,787 | 2/1993 | Skeen et al. | 395/600 |
| 5,210,868 | 5/1993 | Shimada et al. | 395/615 |
| 5,237,678 | 8/1993 | Keuchler et al. | 395/605 |
| 5,251,291 | 10/1993 | Malcolm | 395/146 |
| 5,261,045 | 11/1993 | Scully et al. | 395/161 |
| 5,261,094 | 11/1993 | Everson | 395/600 |
| 5,272,628 | 12/1993 | Koss | 395/764 |
| 5,283,887 | 2/1994 | Zachery | 395/500 |
| 5,301,313 | 4/1994 | Terada et al. | 395/600 |
| 5,315,709 | 5/1994 | Alston, Jr. et al. | 395/606 |
| 5,327,555 | 7/1994 | Anderson | 395/617 |
| 5,333,252 | 7/1994 | Brewer, III et al. | 395/767 |
| 5,339,392 | 8/1994 | Risberg et al. | 395/161 |
| 5,339,434 | 8/1994 | Rusis | 395/200 |
| 5,355,476 | 10/1994 | Fukumura | 395/600 |
| 5,392,390 | 2/1995 | Crozier | 395/161 |
| 5,434,994 | 7/1995 | Shaheen et al. | 395/500 |
| 5,475,833 | 12/1995 | Dauerer et al. | 395/600 |
| 5,519,606 | 5/1996 | Frid-Nielsen et al. | 395/209 |

OTHER PUBLICATIONS

"FRx extends reporting power of Platinum Series: (IBM Desktop Software's Line of accounting software)" Doug Dayton, PC Week, v. 8, n. 5, p.29(2), Feb. 1991.

"The Big Picture (Accessing information on remote data management system)", UNIX Review, v. 7, n. 8, p. 38(7), Aug. 1989.

"Logical Connectivity: Applications, Requirements, Architecture, and Research Agenda," Stuart Madnick and Y. Richard Wang, MIT, System Sciences, 1991, Hawaii Int'l, vol. 1, IEEE, Jun. 1991.

"Automatically Synchronized Objects", Research Disclosure #29261, p. 614 (Aug. 1988).

Cobb et al., "Paradox 3.5 Handbook 3rd Edition", Bantam (1991), pp. 803–816.

Alfieri, "The Best Book of: WordPerfect Version 5.0", Hayden Books (1988), pp. 153–165 and 429–435.

Intellilink Brochure (1990).

User Manual for PC–Link for the B.O.S.S. and the PC–Link for the B.O.S.S., Traveling Software, Inc. (1989).

(List continued on next page.)

Primary Examiner—Thomas G. Black
Assistant Examiner—Donald D. Min
Attorney, Agent, or Firm—Fish & Richardson P.C.

[57] ABSTRACT

A data processing method for synchronizing the data records of a plurality of disparate databases, in which a status file is provided containing data records representative of the contents of data records existing in the disparate databases at a prior synchronization. Data records from at least a first and a second of the plurality of databases are compared to corresponding data records of the status file to determine whether data records of the plurality of databases have changed or been deleted since the prior synchronization, or whether there are new data records since the earlier synchronization. Based on the outcome of the comparing step, decisions are made as to how to update the data records of the first and second databases. Finally, the status file is updated so that its data records are representative of the contents of the data records of the first and second databases after they have been updated.

40 Claims, 5 Drawing Sheets

OTHER PUBLICATIONS

User Manual for Connectivity Pack for the HP 95LX, Hewlett Packard Company (1991).

Organizer Link II Operation Manual, Sharp Electronics Corporation, No Date.

"Open Network Computing –Technical Overview," Sun Technical Report, Microsystems, Inc., pp. 1–32 (1987).

Zahn et al., Network Computing Architecture, pp. 1–11; 19–31; 87–115; 117–133; 187–199; 201–209 (1990).

SYNCHRONIZATION OF DISPARATE DATABASES

BACKGROUND OF THE INVENTION

This invention relates to programs that synchronize databases.

There are many situations in which it is important for a user to be able to synchronize databases among computers. For instance, many users have handheld computers, which typically weigh less than a pound, fit in a pocket, and provide some combination of personal information management functions, database functions, word processing functions, and spreadsheet functions. Many users of handheld computers also own desktop computers used for applications that manage databases similar to the databases carried in handheld computers. Typically the user adds data to the two computers independently, e.g., one enters data into the handheld computer when out at a customer site but enters data into the desktop computer when in the office. In such cases, the user normally would at some point want to synchronize the databases on the handheld and desktop databases, i.e., automatically review changes made to the databases on the two computers, and revise the data in both databases so that both have the same and most current data.

Databases are collections of data organized as data records, each composed of a number of data fields. For example, in an address database, a very simple data record might be "John, Smith, Smith Co.", where "John" is the information content of a FIRSTNAME field, "Smith" is the information content of a LASTNAME field, and "Smith Co." is the information content of a COMPANYNAME field.

Databases are managed by two broad classes of programs, database managers and special-purpose application programs (both referred to herein as database programs). A database manager is a program for managing general databases, that is, databases in which the structure of the data records can be specified at creation time by the user. Other databases are managed by special-purpose application programs, e.g., a telephone directory program of a handheld computer. Unlike the record structures of general databases, the record structures of these special-purpose databases typically are not specified by the user.

There are generally two ways in which software can specify a record in these databases. One or more of the fields of a record can be designated as a key, with particular records being specified by the contents of the key (e.g., the above-mentioned address database might use the LASTNAME field as a key, so that records could be specified by the contents of that field). Records can also be specified using unique identification numbers ("unique IDs"), assigned by the database program at the time the record is created.

There are known techniques for synchronizing databases, but they generally depend on the databases having been specially designed to facilitate synchronization. For example, MICROSOFT™ Schedule+ permits multiple Schedule+ databases to be synchronized, but this is only possible because Schedule+ was specially designed with synchronization in mind. Similarly, directory databases built in conformance with the CCITT X.500 international standard can be synchronized by virtue of conforming to this standard. One way in which synchronization is achieved in such products is by the use of unique IDs assigned when a record is created. During synchronization, the software is able to use the unique IDs to compare the contents of corresponding data records in the two databases (e.g., corresponding data records for the same dinner appointment can be compared even if the date, time, or description for the appointment has been changed in one or both databases).

Another feature available for synchronizing databases specially designed for synchronization are not-yet-synchronized flags, which are set whenever a record is changed (e.g., when a dinner appointment is moved to a new date and time). If the software finds a discrepancy during synchronization, the program then checks each record's not-yet-synchronized flag and, if one flag is set and the other is not, the data in the record with the set flag prevails because it is assumed to be newer. If both flags are set, the data transfer program resorts to using a trump rule (e.g., handheld always prevails over desktop) or interacting with the user because the program does not have enough information to choose one over the other. After synchronization all of the flags are reset.

Also available when databases have been specially designed for synchronization is a time-and-date-of-last-modification stamp for every record stored in the databases. Assuming sufficiently accurate synchronization of the time-and-date clocks of the computers running the databases, the synchronization program can always determine, even if both of the corresponding items have been changed since last synchronization, which change is the most recent, and assume that the more recent record prevails. But such time and date stamping of records will typically be impracticable owing to the scarcity of memory and file space, especially on a handheld computer.

With databases not specially designed for synchronization, there has not heretofore been any practical technique for synchronization. It has been necessary to use either (1) brute force replacement of all of the records of one database with all of the records of the other (e.g., using software such as LapLink) or (2) a reconciliation technique developed by IntelliLink Corp., of Nashua, N.H. (described in U.S. patent application Ser. No. 07/867,167, now U.S. Pat. No. 5,392,390 filed on Apr. 10, 1992; incorporated by reference).

IntelliLink's reconciliation technique uses key fields (e.g., the date and time of appointments in a calendar database) to establish a correspondence between records of the two databases, and then examines the records for differences (e.g., a different appointment description for the same date and time). The differences are reconciled either by invoking one or more trump rules (e.g., handheld always prevails over desktop) or by interacting with the user (e.g., by displaying the relevant mismatching information and asking the user to choose).

An advantage of the reconciliation technique is its ability to handle disparate databases (e.g., databases with different data structures, designed for use with different application software and on different computer platforms). To do its job, the IntelliLink reconciliation technique does not require the presence of special synchronization-enabling features such as unique IDs, not-yet-synchronized flags, or time-and-date-of-last-modification stamps. It can work with databases of radically different design, by first translating the differently structured databases into a common intermediate format, and then using key fields to establish correspondence between records. Yet despite those advantages, and the fact that the reconciliation technique was a huge improvement over the brute force replacement technique that existed before it, reconciliation still falls short of real synchronization.

One difficulty with the existing reconciliation technique is that unless a trump rule such as "handheld always prevails over desktop" is employed, the user is interrogated every time there is a data mismatch, and that interrogation necessarily takes up a lot of time.

In addition, the reconciliation technique does not handle data deletions well, because it inherently assumes that if an item on one computer is empty and its corresponding item on the other computer is not, the empty item should be updated with the non-empty item. This means, e.g., that when a user deletes an appointment from a calendar database on one computer, that appointment could be restored during reconciliation, defeating the user's attempt to delete it.

SUMMARY OF THE INVENTION

The invention makes possible synchronization of disparate databases, overcoming the shortcomings of the prior reconciliation technique. It does so by providing a status file which allows the synchronization program to determine if data records in one or more databases have been changed or deleted since the last synchronization, or whether new data records have been added.

Preferably, the status file contains the data present in the two databases after the most recent synchronization. Corresponding sets of records are chosen from each of the two databases and from the status file, and a comparison is made of the information content of the records. Based on that comparison, updating decisions are made for each set of records, for example, decisions are made whether to select the information content of one database record over the information content of the other, and finally the selected information is written to the status file as well as the databases.

The invention makes it possible to synchronize databases of radically different design, operating on different computer platforms. E.g., a calendar database proprietary to a particular handheld computer or personal digital assistant (PDA) can now be synchronized with a calendar database running on a user's desktop (e.g., LOTUS Organizer™, or MICROSOFT™ Schedule+).

With the invention, it becomes quite practical for a person to use both a PDA and a desktop calendar database in a group scheduling environment, i.e., one in which calendar databases are interconnected between users so that appointments may be added and deleted automatically. Now if an appointment is added or deleted on one database, for example, the user's desktop, the synchronization process of the invention can recognize that such has occurred and automatically update the other during a synchronization.

Synchronization of disparate databases can be performed with much less user interaction than was necessary with the prior reconciliation technique. E.g., by applying a rule that newer database changes prevail over older changes, in connection with a preferred decision matrix, the user can allow synchronization to occur with minimal or no interaction.

The invention permits databases that were specially designed for synchronization to be synchronized with databases that were not so designed. Embodiments of the invention can work with databases that provide time-and-date-of-last-modification stamps, not-yet-synchronized flags, or unique IDs, but also with databases that provide no such stamps, flags, or IDs.

The invention also provides a backup function for information in a database because the status file can be used to reconstruct a complete, earlier version of the database.

The invention may be used to synchronize two or more databases on the same computer or on different computers.

Other features and advantages of the invention will be apparent from the following description of preferred embodiments, and from the claims.

DESCRIPTION OF THE PREFERRED EMBODIMENTS

Figure 1:
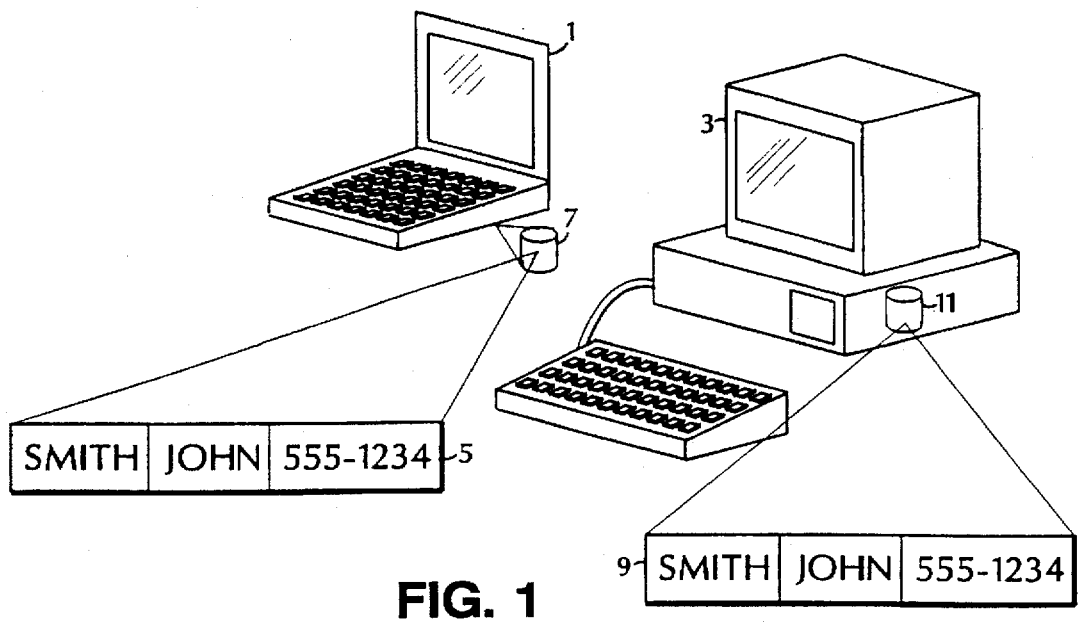
FIG. 1 illustrates both a handheld and a desktop computer, and shows, diagrammatically, a database and data records for each.

Shown in FIG. 1 are two computers on which disparate databases reside, a database 7 in a handheld computer 1 and a database 11 in a desktop computer 3. Synchronization depends on knowledge of: (1) how records 5 in one database 7 correspond to records 9 in the other 11 and (2) the history of updates in each database. For correspondence, the synchronization program relies on the basic translation and mapping capabilities of the prior IntelliLink reconciliation technique (e.g., as described in U.S. patent application Ser. No. 07/867,167, now U.S. Pat. No. 5,392,390 filed on Apr. 10, 1992, referred to earlier).

The synchronization program is typically run repeatedly over time. E.g., the user may choose to run synchronization daily, weekly, or on an irregular "as needed" basis.

When conflicts are detected during synchronization (i.e., differences in the content of key fields), they may be resolved automatically or interactively, depending on user preference. The user may select among different automatic rules, including:

1. Always propagate deletions even if that means deleting a recently changed item.

2. Let handheld changes override desktop changes.

3. Let desktop changes override handheld changes.

4. Keep both versions and no longer attempt to reconcile them.

5. Leave the conflict unresolved.

If a conflict is to be resolved interactively, the user is presented with a dialog box that allows the user to select one of these rules.

Since it is possible that a user may enter the same new information into both the handheld and the desktop computer, the synchronization program checks for this possibility in order to avoid duplication of data. The program compares all new desktop records with all new handheld records, and, when matches are found, the matches are assumed to correspond to one another.

Figure 2:
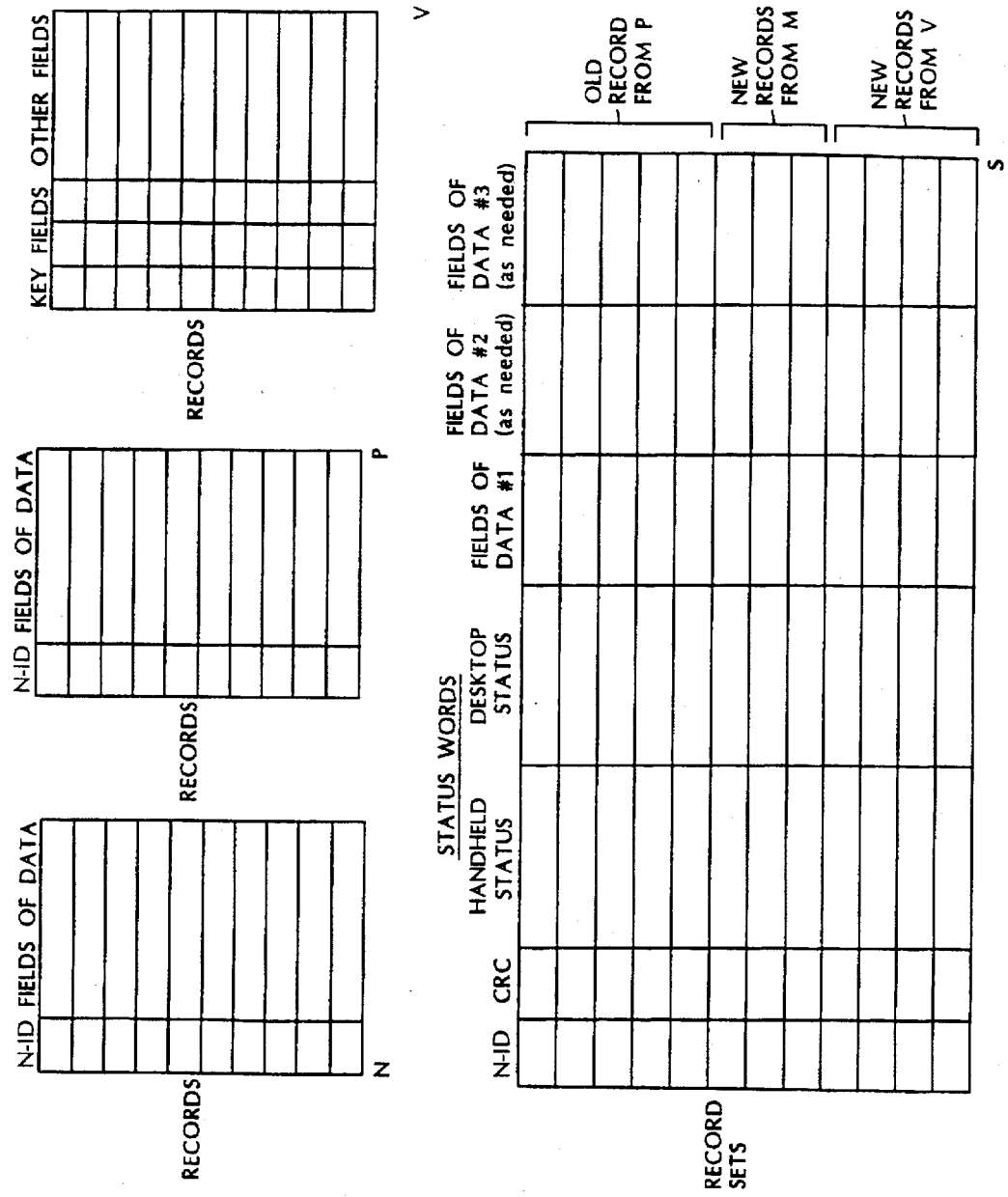
FIG. 2 shows a handheld database, status file, desktop database, and temporary workspace of a preferred embodiment of the invention.

FIG. 2 shows the data structure of a preferred embodiment. There are three databases: handheld database N, desktop database V, and status file P. In this embodiment, the handheld database has unique IDs that identify its records, but the desktop database has no such IDs, and its records are identified through the use of key fields. The handheld records are mapped to desktop records using a key field or set of key fields. For example, in a telephone database, the mapping could be done using the LASTNAME field as the key field. This makes it possible to achieve a correspondence between the handheld IDs and the desktop key fields. For example, a handheld record with an ID of "A987" ends up associated with a desktop record identified by the key field LASTNAME="Smith".

The following descriptions assume that all of the corresponding records of the handheld database and the desktop database have already been mapped using such existing methods. The records in the status file are identified using IDs originating in the handheld database. FIGS. 2–6 use the following abbreviations: P for status file, N for handheld computer database, V for desktop computer database, and S for synchronization workspace.

The synchronization workspace S is a temporary memory workspace used by the synchronization program. The workspace S maintains several pieces of information for each record in the database, including a handheld-ID, a CRC value, and status indicators providing handheld-status and desktop-status. The handheld-ID is a unique ID identifying each record in the handheld database. The CRC value identifies a desktop record, and is obtained using a well-known algorithm that maps a unique variable-length string of data to a nearly unique integer of shorter, fixed length. E.g., if the key fields used to identify a desktop record are Firstname, Lastname, and Company Name, then the CRC value would be a short, fixed length integer derived from a string such as "John, Smith, Smith Co." Methods of comparing strings of data are well-known in the art; this embodiment uses a method in which first the CRC values of strings are computed and compared; if the CRC values match, the full strings are then compared directly.

Handheld-status and desktop-status generally indicate the status of the handheld and desktop data records with respect to corresponding records in the status file. For example, a previously synchronized item that has since been changed in the handheld computer but is unchanged in the desktop would have handheld-status set to CHANGED and desktop-status set to UNCHANGED. Since handheld records are correlated first, before desktop records, the meaning of handheld-status is slightly different from the meaning of desktop-status. Handheld-status describes handheld records relative to status file records only. Desktop-status, on the other hand, describes desktop records relative to status file records and any new handheld records.

The status file P, which is saved after a synchronization and used as input to the next synchronization, is a file containing one record per pair of synchronized handheld and desktop records. Each status file record (each line in file P in FIG. 2) is a simple unconflicted record, i.e., is identified by only one set of key fields or IDs. Due to prior mapping of handheld records to desktop records, the use of only one set presents no problem with respect to the other set. In this embodiment, status file records are identified by handheld-IDs, but in the case where there are no IDs in either database, the status file records could be identified by a key field from one database.

Figure 3:
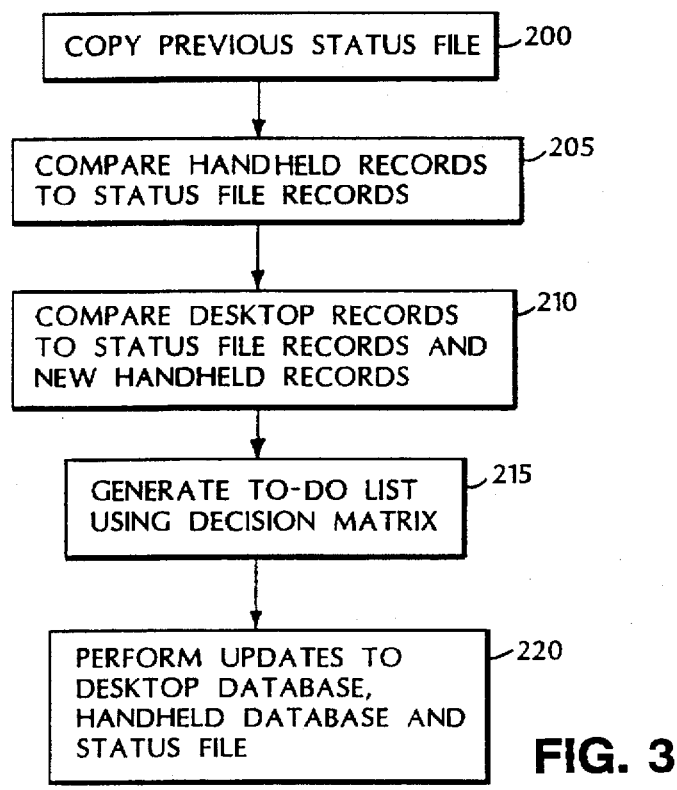
FIG. 3 is a flowchart of the preferred embodiment.

FIG. 3 shows the synchronization process. The previous status file is read (step 200). This gives a list of records. The first time that synchronization is run, no previous status file exists, in which case step 200 produces an empty list of records.

Synchronization begins with the program retrieving records from the handheld database and comparing them to the records in the status file (step 205). For every handheld record, the synchronization program takes note of the record's status, i.e., whether a corresponding status file record exists, and if so, whether the handheld record has been changed. If there are new handheld records, i.e., records in the handheld database that are not in the status file (e.g., new telephone number entries in a telephone database, or new appointments in a calendar database), the synchronization program retains these new handheld records for use in subsequent steps.

Next, the synchronization program (step 210) retrieves records from the desktop database and compares them to the records in the status file and the new handheld records. For every desktop record, the synchronization program takes note of the record's status, i.e., whether a corresponding status file record exists, and if so, whether that record has changed in the desktop database. If there are new desktop records, i.e., records in the desktop database that are neither in the status file nor among the new handheld records, the synchronization program takes note of these new desktop records for subsequent steps.

After this comparing step, the synchronization program (step 215) uses a decision matrix to generate a To-Do list of actions to be taken with respect to the records in the handheld database and the desktop database. The decision matrix takes as inputs the status with respect to the status file, i.e., CHANGED, UNCHANGED, NEW, or ABSENT, of each record in each record set and outputs a To-Do list action item for each record set. For example, if the status of a handheld record is UNCHANGED and the status of its corresponding desktop record is CHANGED, then the decision matrix output action item is to update the handheld record and the status file record to match the desktop record.

Finally, the synchronization program (step 220) goes through the To-Do list and performs updates to the desktop database, handheld database, and status file. If any of the updates to the desktop and handheld databases are unsuccessful, the synchronization program refrains from making these updates to the status file, so that the synchronization program will retry the update at the next synchronization.

Figure 4:
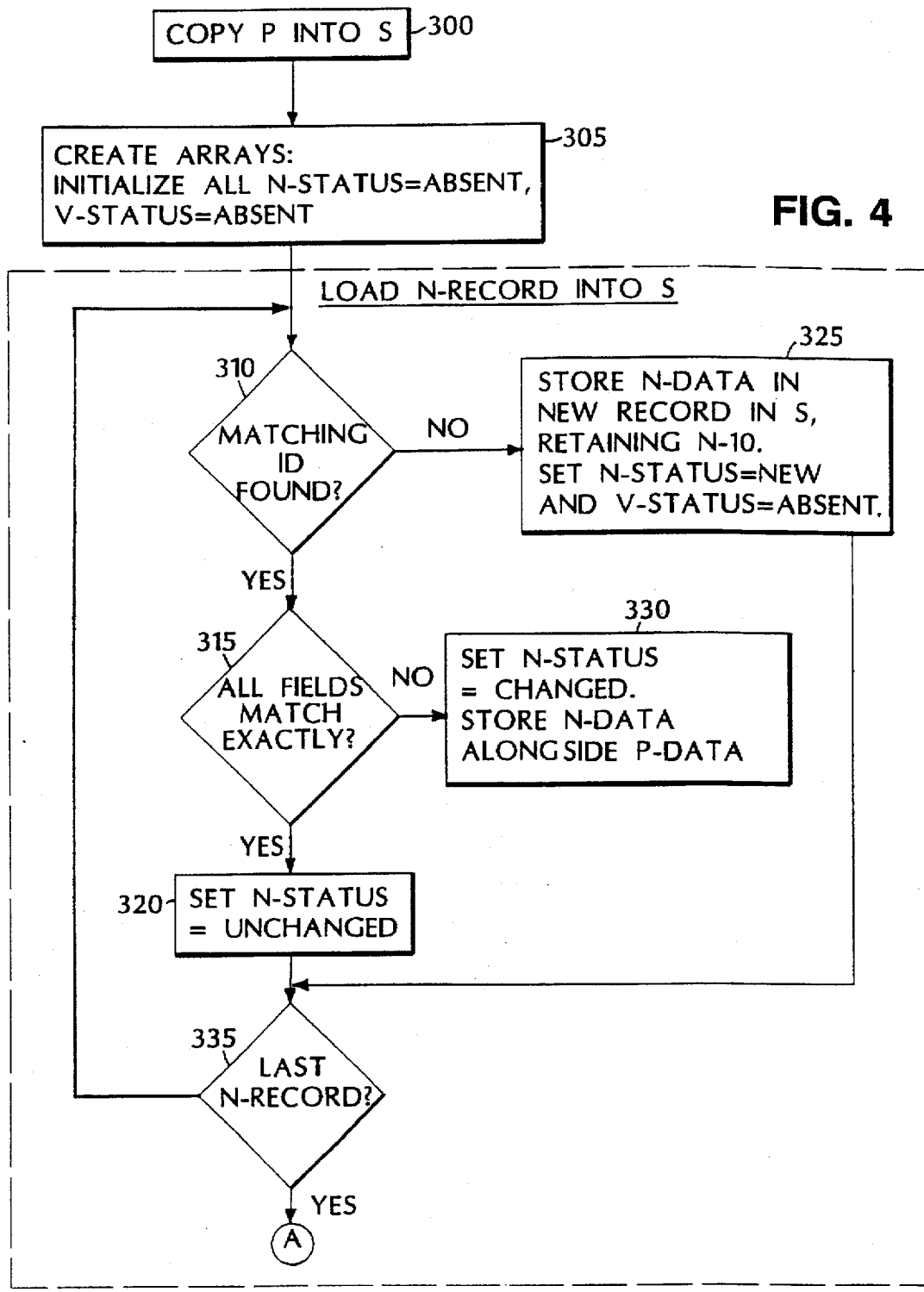
FIGS. 4-6 are three sections of a flowchart showing the preferred embodiment in more detail.
Figure 5:
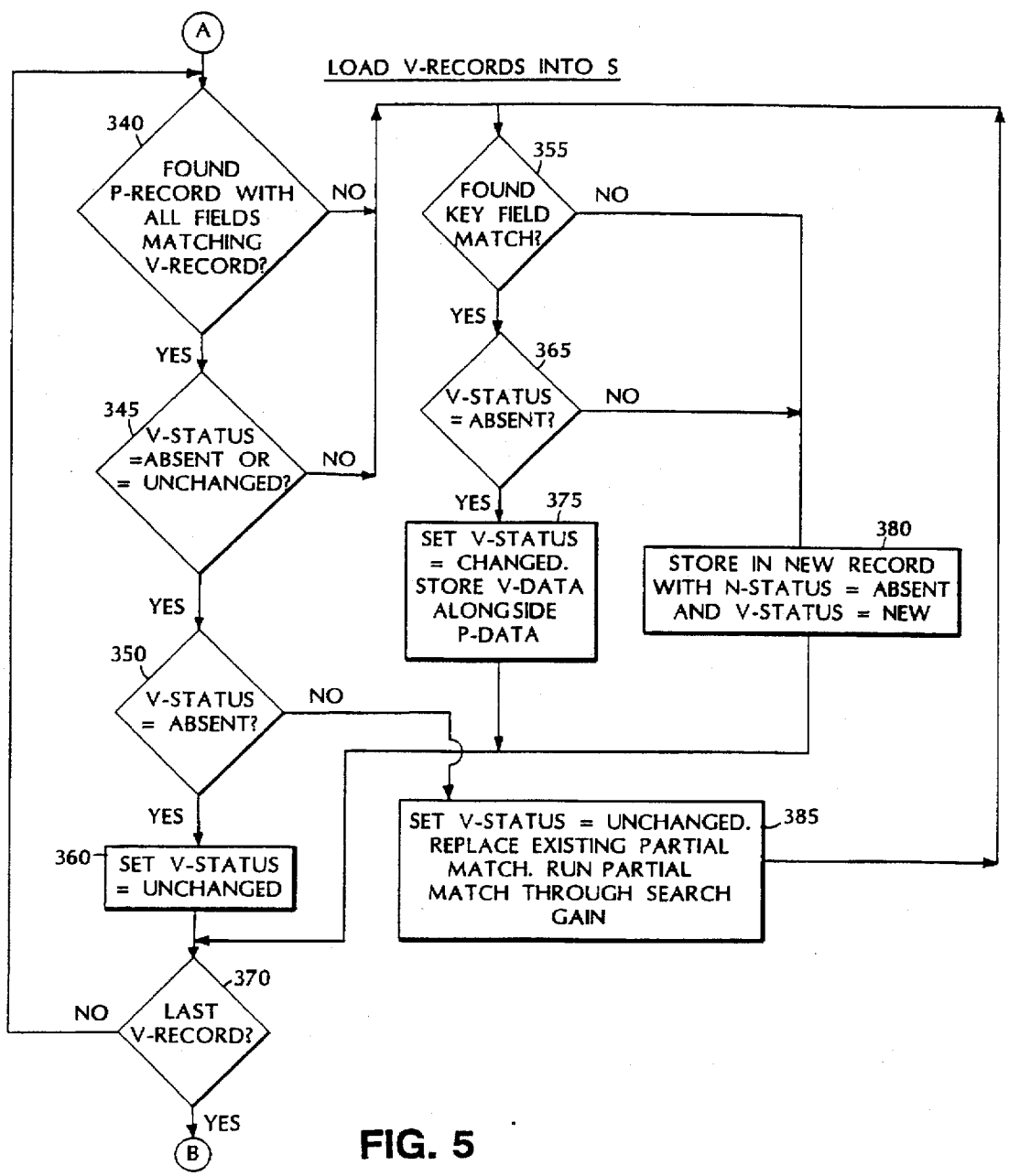
Figure 6:
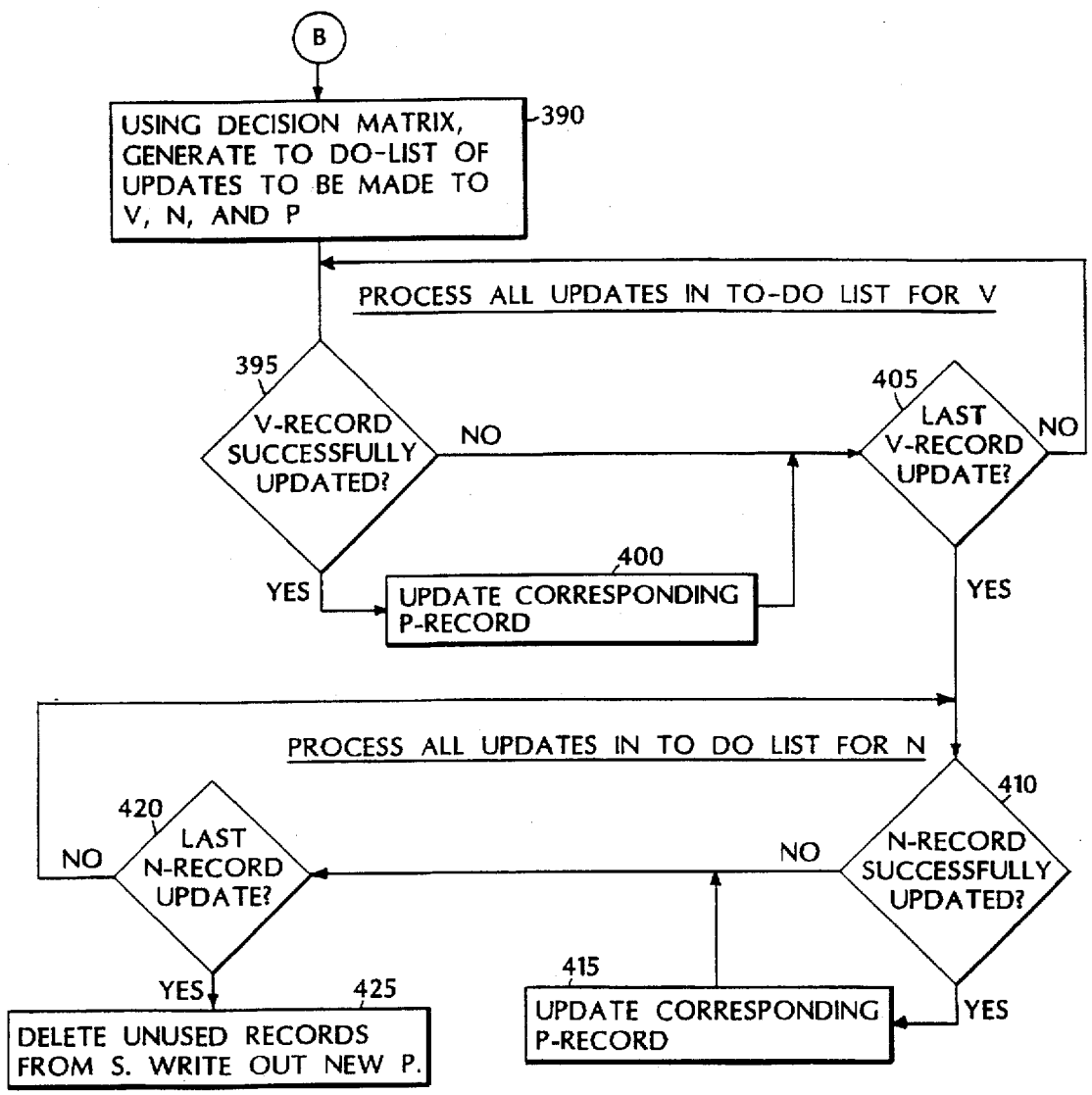

FIGS. 4–6 show the synchronization process in more detail. The information in status file P is copied into synchronization workspace S (step 300). Arrays of handheld-IDs, CRCs, and status indicators are created and populated in workspace S (step 305). All status indicators are initialized with handheld-status set to ABSENT and desktop-status set to ABSENT. Subsequent processing steps will change these status indicators to other values if the corresponding records still exist in handheld database N or desktop database V or both.

Handheld records are loaded, one by one, into workspace S. In this loading process, incoming handheld records are correlated with pre-existing status file records using the handheld-ID as the correlation key (step 310). When a match of IDs is found, all mapped fields of the handheld record and status file record are compared (step 315). If all fields match exactly, handheld-status is set to UNCHANGED (step 320), but otherwise handheld-status is set to CHANGED (step 330). If handheld-status is set to CHANGED, all data from the handheld record is stored in workspace S alongside the data from the corresponding status file record. No further "conflict resolution" action is taken at this point in the procedure.

If there is no status file record with the same handheld-ID as the incoming handheld record, the incoming handheld record is stored in workspace S (step 325). For this incoming handheld record, its handheld-ID is retained, the CRC of its key fields is computed and stored for later use in a possible match to a desktop record, and its status indicators are set as follows: handheld-status is set to NEW and desktop-status is set to ABSENT.

Steps 310–335 are repeated for all handheld records (step 335).

Once the last handheld record is processed, correlation of handheld records with status file records is complete. From this point on in this procedure the term handheld record refers only to any record in workspace S for which handheld-status is set to NEW.

Desktop records are loaded, one by one, into workspace S (FIG. 5). For each desktop record, first an unused exact match is sought. An unused exact match is a status file record or new handheld record wherein all fields match those of the desktop record (step 340) and desktop-status is set either to ABSENT or CHANGED (step 345). If such a match record is found with desktop-status set to ABSENT (step 350), desktop-status is simply updated to UNCHANGED (step 360). However, if such a match record is found with desktop-status set to CHANGED, this means that there is more than one desktop record that maps to the match record. It also means that when a previous desktop record was loaded, it was identified, using key field matching as described below, as a partial match for this handheld or status file record. Now the partial match is replaced with the present desktop record, desktop-status is set to UNCHANGED, and then the partial match is run through the key field search again (step 385).

If no unused exact match is found, then a key field match is sought (step 355). The key field match must also be unused, i.e., the status file record or handheld record found must also have a desktop-status that is set to ABSENT (step 365). If such a match is found, desktop-status is set to CHANGED and all of the data in the desktop record is stored alongside the data of the match (375). No further "conflict resolution" action is taken at this point in time because this desktop record could eventually be replaced if an exact match is later found for this handheld or status file record, as described above in step 385. If no unused key field match is found, a new record is created in workspace S with handheld-status set to ABSENT and desktop-status set to NEW (385).

Steps 340–385 are repeated for all desktop records (step 370).

Once all desktop records are exhausted, workspace S is scanned from top-to-bottom and decisions are made, using the decision matrix of Table 1, about how to resolve any conflicts, either interactively or non-interactively (FIG. 6, step 390). The decisions are not implemented immediately but rather are held as actions items in a To-Do list.

TABLE 1

Decision Matrix

| # | Handheld-Status | Desktop-Status | To Do |
|---|---|---|---|
| 1 | UNCHANGED | UNCHANGED | Nothing. |
| 2 | UNCHANGED | CHANGED | Update handheld database N and workspace S to match desktop database V. |
| 3 | UNCHANGED | ABSENT | Delete record from handheld database N and workspace S. |
| 4 | CHANGED | UNCHANGED | Update desktop database V and workspace S to match handheld database N. |

TABLE 1-continued

Decision Matrix

| # | Handheld-Status | Desktop-Status | To Do |
|---|---|---|---|
| 5 | CHANGED | CHANGED | If changes are independent, update handheld database N, workspace S, and desktop database V; otherwise use a conflict resolution (CR) dialog with the user or apply an automatic rule. |
| 6 | CHANGED | ABSENT | Resolve CHANGE vs. DELETE conflict, either via CR dialog or by applying an automatic rule. |
| 7 | ABSENT | UNCHANGED | Delete record from desktop database V and workspace S. |
| 8 | ABSENT | CHANGED | Resolve CHANGE vs. DELETE conflict, either via CR dialog or by applying an automatic rule. |
| 9 | ABSENT | ABSENT | Delete record from workspace S (it has already been deleted from handheld database N and desktop database V). |
| 10 | ABSENT | NEW | Add record to handheld database N and workspace S. |
| 11 | NEW | ABSENT | Add record to desktop database V and workspace S. |
| 12 | NEW | UNCHANGED | Add record to workspace (synchronizing identical items here). |
| 13 | NEW | CHANGED | Resolve conflict, either via CR dialog or by applying an automatic rule. (Note that this case is semantically different from case #5, so different automatic rules may apply, but the CR dialog may be the same.) |

All updates in the To-Do list for desktop database V are attempted (step 405). If a particular update, i.e., an ADD, CHANGE, or DELETE, is successful (step 395), the same update is also performed on the corresponding record in workspace S (step 400).

Next, all updates in the To-Do list for handheld database N are attempted (step 420). If a particular update is successful (step 410), the same update is also performed on the corresponding record in S (step 415).

Finally, all records with both handheld-status and desktop-status set to ABSENT are deleted from workspace S (step 425). This reduces workspace S down to a minimum size so that it contains only the information that must be stored as the new status file for the next synchronization.

Other Embodiments

Other embodiments of the invention are within the following claims. For example, whereas the embodiment described above synchronized a database with records identified by IDs with another with records identified by key fields, the invention also works with databases in which both databases have only records identified by key field, and with databases that provide time-and-date-of-last-modification stamps, not-yet-synchronized flags, or unified or non-unified IDs (as well as with databases that provide no such stamps, flags, or IDs).

The invention is also not limited to use with a combination of a handheld computer and a desktop computer (although it is particularly advantageous for such an environment). The invention may be used to synchronize data of two or more desktop computers, two or more notebook computers, two or more handheld computers, or any combination of microcomputers, minicomputers, mainframe computers, or other computers. The invention may also be used to synchronize two or more databases on the same computer.

The invention may also be used to synchronize more than two databases. This can be accomplished, for example, by running the synchronization program multiple times, each time synchronizing a new database to an already-synchronized database. For example, in order to synchronize databases A, B, C, and D, the synchronization program could be run first on A and B, then A and C, then A and D; or first on A and B, then B and C, then C and D, etc. Separate status files would be maintained for each pair.

What is claimed is:

1. A data processing method for synchronizing the data records of a plurality of disparate databases, the method comprising the steps of:

providing a status file containing data records reflecting the contents of data records existing in at least one of the disparate databases at the time of a prior synchronization;

comparing data records from at least one of a first and a second of the plurality of databases to corresponding data records of the status file to determine whether data records of the database have changed or been deleted since the prior synchronization or whether there are new data records since the earlier synchronization;

updating the first and second databases based on the outcome of the comparing step; and updating the status file so that its data records reflect the contents of the data records after they have been updated.

2. The method of claim 1 wherein the comparing step further comprises deciding whether to delete a data record from the first database based on the comparing step having determined that the corresponding record of the second database has been deleted since the earlier synchronization.

3. The method of claim 2 wherein the comparing step comprises three steps:

a first comparing step comprising comparing data records from the first database to corresponding data records of the status file to determine whether any of the data records of the plurality of databases have changed or been deleted since the prior synchronization or whether there are new data records since the earlier synchronization;

storing new status file data records representative of new data records found in the first comparing step; and a second comparing step comprising comparing data records from the second database to corresponding data records of the status file and to the new status file data records.

4. The method of claim 3 wherein status indicators for each of the first and second databases are produced on the basis of the outcome of the first and second comparing steps.

5. The method of claim 4 wherein the status indicators comprise indicators indicative of the following outcomes of the comparisons performed in the first and second comparing steps: (1) the database record is unchanged relative to the corresponding status file data record; (2) the database record is changed relative to the corresponding status file data record; (3) the database record is absent from the status file data records; (4) the database record is new, meaning it is not among the status file data records.

6. The method of claim 5 wherein the status file has a single set of data records, one corresponding to each data record of the first and second databases at the prior synchronization.

7. The method of claim 6 wherein the data records of the first and the second databases are without unique identification codes.

8. The method of claim 11 wherein data records of the status file are identified by at least one key field of the first database.

9. The method of claim 7 wherein the correspondence between data records of the first and second databases is achieved by comparing key fields of the databases.

10. The method of claim 4 wherein the status indicators comprise indicators indicative of the following outcomes of the comparisons performed in the comparing step: (1) the database record is unchanged relative to the corresponding status file data record; (2) the database record is changed relative to the corresponding status file data record; (3) the database record is absent from the status file data records; (4) the database record is new, meaning it is not among the status file data records.

11. The method of claim 3 wherein the second comparing step further comprises storing further new status file data records representative of new data records found in the second comparing step.

12. The method of claim 11 wherein a set of workspace data records are used during synchronization, the workspace data records each having an identifier corresponding to the identifier of the data records in the status file, and status indicator for each of the first and second databases.

13. The method of claim 12 wherein the new status file data records are stored first as workspace data records.

14. The method of claim 13 wherein following completion of the first and second comparing steps, the workspace data records are processed by comparing each pair of stored status indicators to a decision matrix to determine an action to be taken in updating the first and second databases.

15. The method of claim 11 wherein the second comparing step further comprises examining for unused exact matches in the data records of the second database.

16. The method of claim 11 wherein the second comparing step further comprises examining for key field matches in the data records of the second database.

17. The method of claim 2 wherein the status file has a single set of data records, one corresponding to each data record of the first and second databases at the prior synchronization.

18. The method of claim 2 wherein at least the data records of the first database are each identified by unique identification codes.

19. The method of claim 18 wherein data records of the status file are identified by the unique identification code of the first database.

20. The method of claim 18 wherein the correspondence between data records of the first and second databases is achieved by comparing key fields of the databases.

21. A data processing system for synchronizing the data records of a plurality of disparate databases, the system comprising:

means for providing a status file containing data records reflecting the contents of data records existing in at least one of the disparate databases at the time of a prior synchronization;

means for comparing data records from at least one of a first and a second of the plurality of databases to corresponding data records of the status file to determine whether data records of the database have changed or been deleted since the prior synchronization or whether there are new records since the prior synchronization;

means for updating the first and second databases based on the outcome of the comparing step; and means for updating the status file so that its data records reflect the contents of the data records after they have been updated.

22. The system of claim 21 wherein the deciding further comprises deciding whether to delete a data record from the first database based on the comparing having determined that the corresponding record of the second database has been deleted since the earlier synchronization.

23. The system of claim 22 wherein the means for comparing comprises:

a first comparing comprising comparing data records from the first database to corresponding data records of the status file to determine whether any of the data records of the plurality of databases have changed or been deleted since the prior synchronization or whether there are new data records since the earlier synchronization;

storing new status file data records representative of new data records found in the first comparing; and a second comparing comprising comparing data records from the second database to corresponding data records of the status file and to the new status file data records.

24. The system of claim 23 wherein status indicators for each of the first and second databases are produced on the basis of the outcome of the first and second comparing.

25. The system of claim 24 wherein the status indicators comprise indicators indicative of the following outcomes of the comparisons performed in the first and second comparing: (1) the database record is unchanged relative to the corresponding status file data record; (2) the database record is changed relative to the corresponding status file data record; (3) the database record is absent from the status file data records; (4) the database record is new, meaning it is not among the status file data records.

26. The system of claim 25 wherein the status file has a single set of data records, one corresponding to each data record of the first and second databases at the prior synchronization.

27. The system of claim 26 wherein the data records of the first and the second databases are without unique identification codes.

28. The system of claim 27 wherein data records of the status file are identified by at least one key field of the first database.

29. The system of claim 27 wherein the correspondence between data records of the first and second databases is achieved by comparing key fields of the databases.

30. The system of claim 24 wherein the status indicators comprise indicators indicative of the following outcomes of the comparisons performed in the comparing: (1) the database record is unchanged relative to the corresponding status file data record; (2) the database record is changed relative to the corresponding status file data record; (3) the database record is absent from the status file data records; (4) the database record is new, meaning it is not among the status file data records.

31. The system of claim 23 wherein the second comparing further comprises storing further new status file data records representative of new data records found in the second comparing.

32. The system of claim 31 wherein a set of workspace data records are used during synchronization, the workspace data records each having an identifier corresponding to the identifier of the data records in the status file, and status indicator for each of the first and second databases.

33. The system of claim 32 wherein the new status file data records are stored first as workspace data records.

34. The system of claim 33 wherein following completion of the first and second comparing, the workspace data records are processed by comparing each pair of stored status indicators to a decision matrix to determine an action to be taken in updating the first and second databases.

35. The system of claim 32 wherein the second comparing further comprises examining for unused exact matches in the data records of the second database.

36. The system of claim 32 wherein the second comparing further comprises examining for key field matches in the data records of the second database.

37. The system of claim 22 wherein the status file has a single set of data records, one corresponding to each data record of the first and second databases at the prior synchronization.

38. The system of claim 22 wherein at least the data records of the first database are each identified by unique identification codes.

39. The system of claim 38 wherein data records of the status file are identified by the unique identification code of the first database.

40. The system of claim 38 wherein the correspondence between data records of the first and second databases is achieved by comparing key fields of the databases.

* * * * *

UNITED STATES PATENT AND TRADEMARK OFFICE
CERTIFICATE OF CORRECTION

PATENT NO.   : 5,684,990

DATED        : November 4, 1997

INVENTOR(S)  : David J. Boothby

It is certified that error appears in the above-identified patent and that said Letters Patent is hereby corrected as shown below:

Column 10, line 8, "claim 11" should be --claim 7--.

Signed and Sealed this

Twenty-sixth Day of May, 1998

Attest:

BRUCE LEHMAN

Attesting Officer

Commissioner of Patents and Trademarks